(12) United States Patent
Wu et al.

(10) Patent No.: US 7,311,808 B2
(45) Date of Patent: Dec. 25, 2007

(54) DEVICE AND METHOD FOR INCREASING MASS TRANSPORT AT LIQUID-SOLID DIFFUSION BOUNDARY LAYER

(75) Inventors: Qunwei Wu, Westford, MA (US); Craig L. Brodeur, Marlborough, MA (US); John E. Pillion, Hollis, NH (US); Jieh Hwa Shyu, Andover, MA (US)

(73) Assignee: Entegris, Inc., Chaska, MN (US)

( * ) Notice: Subject to any disclaimer, the term of this patent is extended or adjusted under 35 U.S.C. 154(b) by 583 days.

(21) Appl. No.: 10/513,265

(22) PCT Filed: May 2, 2003

(86) PCT No.: PCT/US03/14019

§ 371 (c)(1),
(2), (4) Date: Nov. 2, 2004

(87) PCT Pub. No.: WO03/092891

PCT Pub. Date: Nov. 13, 2003

(65) Prior Publication Data

US 2005/0173243 A1    Aug. 11, 2005

Related U.S. Application Data

(60) Provisional application No. 60/377,257, filed on May 2, 2002.

(51) Int. Cl.
*C25D 17/10* (2006.01)

(52) U.S. Cl. .............. 204/224 M; 205/648; 205/653; 205/668; 205/670; 205/672; 204/245; 204/252; 204/263; 204/264

(58) Field of Classification Search ........... 204/224 M, 204/245, 252, 263, 264; 205/648, 653, 668, 205/670, 672
See application file for complete search history.

(56) References Cited

U.S. PATENT DOCUMENTS

| 5,087,344 | A |   | 2/1992  | Wenske et al. ........... 204/256 |
|-----------|---|---|---------|----------------------------------|
| 5,096,550 | A |   | 3/1992  | Mayer et al. ........... 204/129.4 |
| 5,102,521 | A |   | 4/1992  | Usuda et al. ............. 204/198 |
| 5,143,593 | A |   | 9/1992  | Ueno et al. .............. 205/291 |
| 5,616,246 | A |   | 4/1997  | Gagnon et al. ........... 210/490 |
| 5,834,633 | A | * | 11/1998 | Davison .................. 73/53.01 |
| 6,126,798 | A |   | 10/2000 | Reid et al. ................ 204/282 |

* cited by examiner

*Primary Examiner*—Bruce F. Bell
(74) *Attorney, Agent, or Firm*—Timothy J. King; John E. Pillion

(57) ABSTRACT

A device and method for increasing the mass transport rate of a chemical or electrochemical process at the solid and fluid interface in a fluid cell. The device includes a membrane in close contact with surface of the work piece, to separate the process cell into two chambers, so that fluid velocity at the work piece is controlled separately from the main cell flow. Thus the diffusion boundary layer is controlled and minimized by the rate that fluid is withdrawn from the work piece chamber.

27 Claims, 12 Drawing Sheets

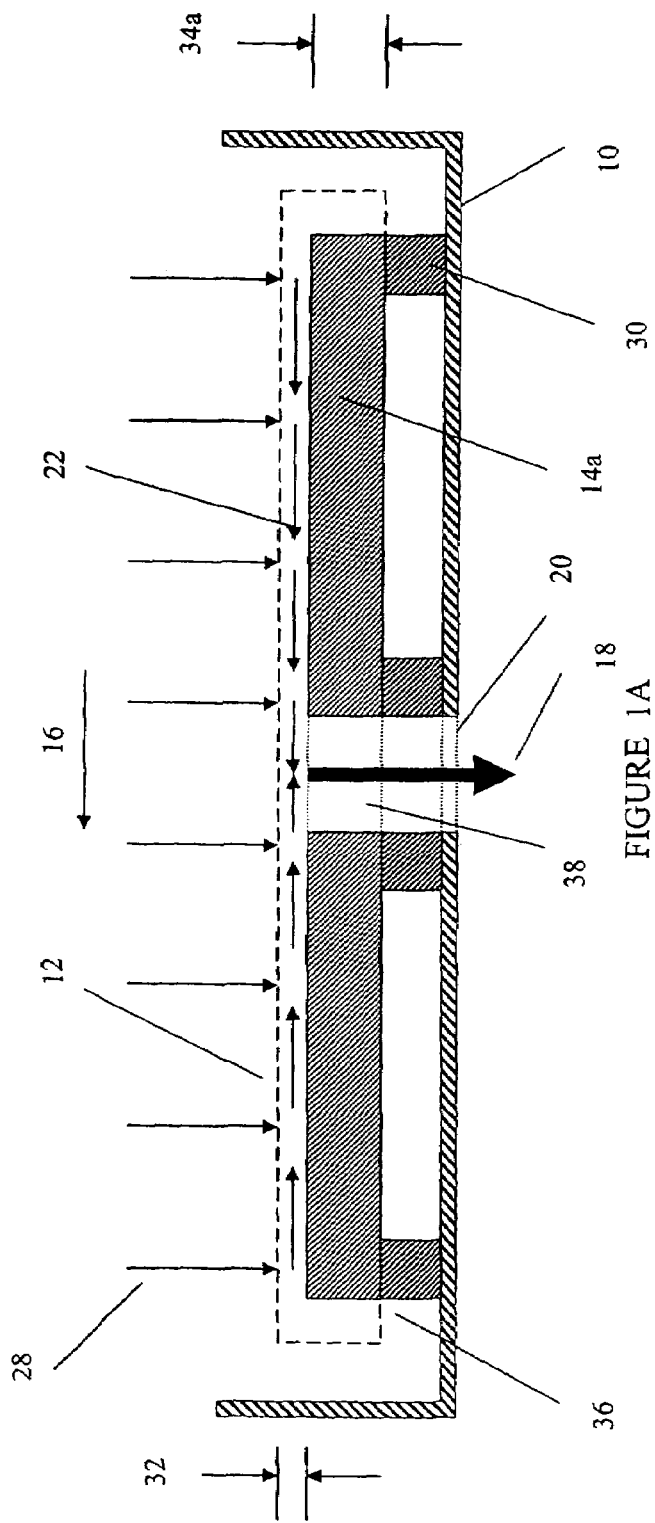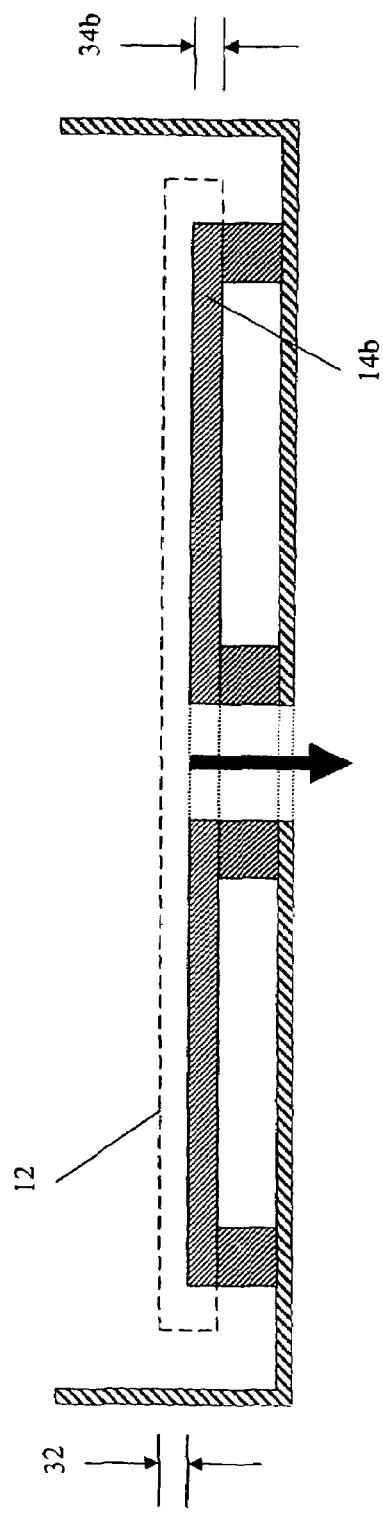

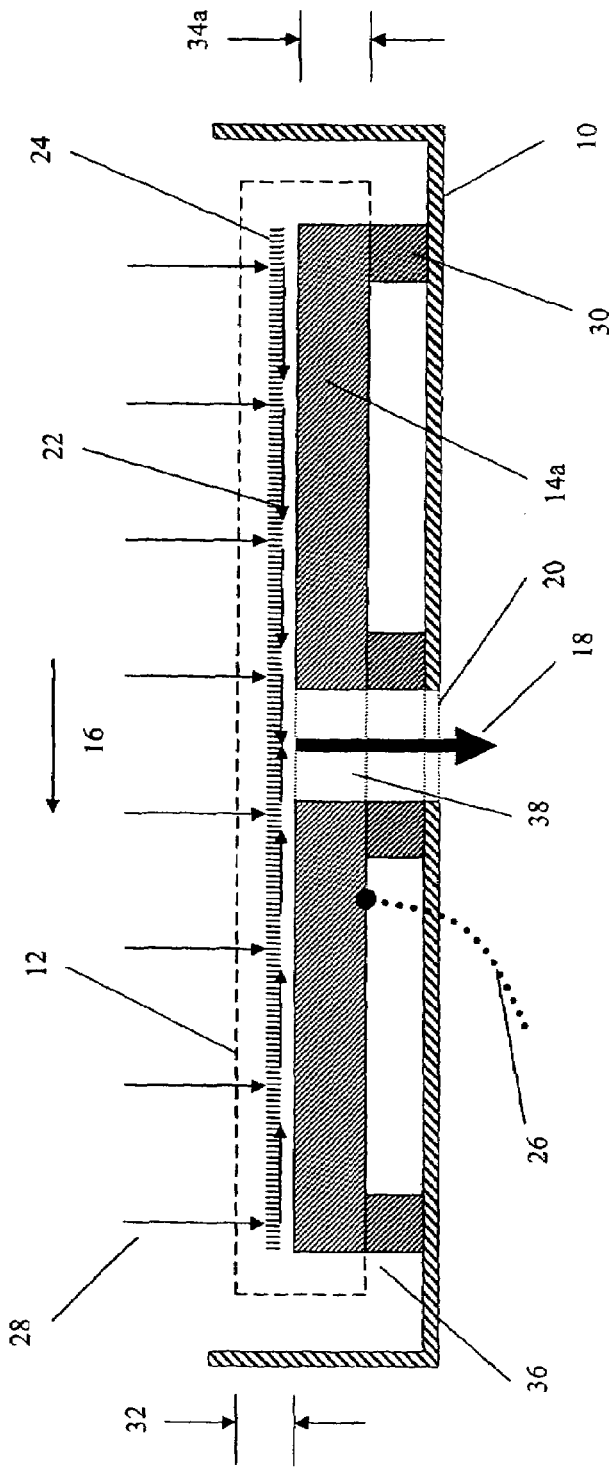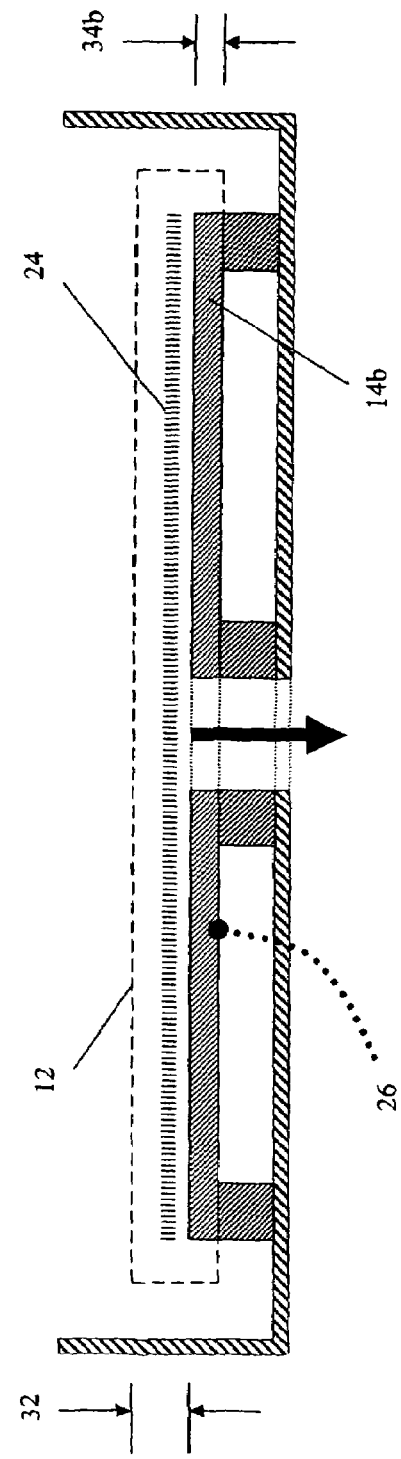

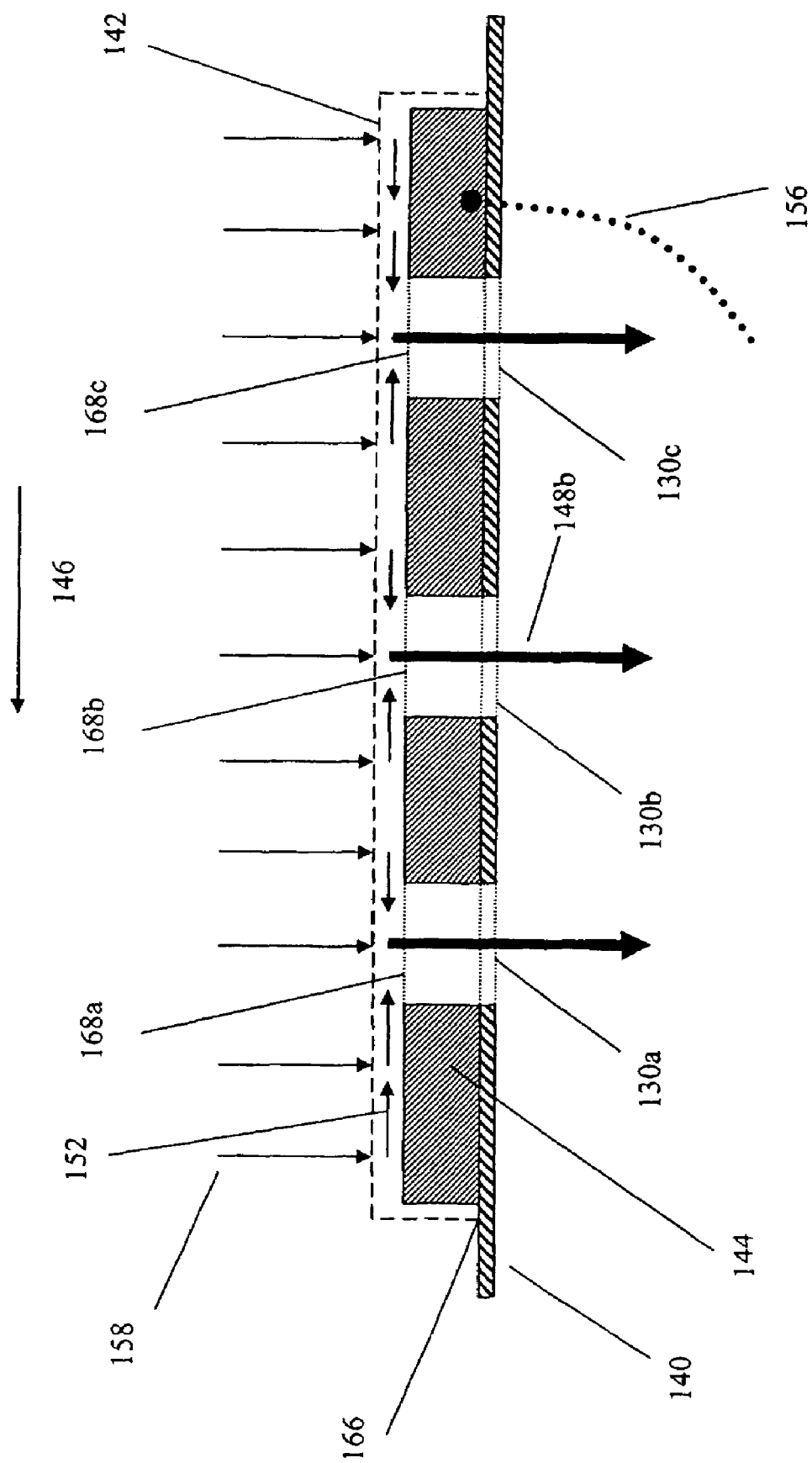

DEVICE AND METHOD FOR INCREASING MASS TRANSPORT AT LIQUID-SOLID DIFFUSION BOUNDARY LAYER

CROSS REFERENCES TO RELATED APPLICATION

This application claims priority from U.S. Provisional Application Ser. No. 60/377,257 filed May 2, 2002, titled "DEVICE AND METHOD FOR INCREASING MASS TRANSPORT AT LIQUID-SOLID DIFFUSION BOUNDARY LAYER", the contents of which are incorporated herein by reference in their entirety.

BACKGROUND OF INVENTION

Many manufacturing processes rely on the chemical or electrochemical reactions at the solid and fluid interface of a flow cell. Examples are electrochemical machining and solid catalysis reactions. Rates of chemical reactions between the fluid and solid interface are governed by the mass transport rate of the reactants or products at the interface. The mass transport rate, determined by Ficks' Law, is proportional to the concentration of the chemical species, the diffusion coefficient and is inversely proportional to the diffusion boundary layer thickness. As the diffusion boundary layer is determined by the fluid velocity near the solid surface, a higher flow rate increases the mass transport rate and, hence, the reaction rate. Therefore, agitation or circulation of the fluid is commonly used in chemical processes between fluids and surfaces to reduce the boundary layer and enhance the mass or energy transport rate.

As the volume of the fluid increases, strong agitation is required to circulate large volumes of fluid across the solid surface. Since the diffusion boundary layer is primarily determined by the flow velocity near the surface of the solid, the bulk of the fluid flow away from the solid and fluid interface has little effect on the diffusion boundary layer. A great percentage of the energy used for circulating the fluid is wasted. The need for a large flow rate also increases the complexity of the design of such chemical reactor systems. Furthermore, as a uniform diffusion boundary is critical for certain coating applications, such as electroplating processes, elaborate equipment design results in high capital cost.

Other means for increasing the mass or energy transport rate to facilitate reactions between fluids in contact with surfaces include vibration, impinging jet flow, or spray. However, such methods are often either not practical or impossible due to other restriction of particular processes.

For process consistency it is advantageous to provide a uniform mass or energy transport rate across the solid surface. Membranes are commonly used to separate the anode and cathode compartments in electroplating but these membranes either impede or accelerate ion transfer in the bulk fluid only, still leaving mass transfer at the anode or cathode up to the uncontrolled boundary layer if other means, described above, are not used. Indeed, the electroplating systems described in U.S. Pat. Nos. 5,096,550 and 6,126,798 fail to consider control of the fluid flow at this interface. Anode bags described in U.S. Pat. No. 5,616,246 also fail to consider this problem. Other references such as JP4052296 and EP471577 also fail to adequately consider control of the solid-liquid boundary layer.

There is a need to control fluid flow at the solid and fluid interface, and enhance the mass or energy transport rate at the solid interface without circulating a large volume of fluid.

SUMMARY OF THE INVENTION

The present invention is directed to an apparatus for controlling the fluid flow at the interface between a substrate and a fluid by utilizing a membrane to create a thin film of fluid on the substrate. The device may be used to control the transfer of mass or energy between the substrate and the fluid. Preferably the apparatus is used to increase the mass transport from a substrate to a fluid at the solid-fluid diffusion boundary layer. The apparatus and method may be used for increasing the mass transport rate of a chemical process at the solid and fluid interface in a fluid cell. The device includes a membrane in close contact with surface of a substrate or work piece, to separate the process cell into two chambers, so that the fluid velocity at the work piece is controlled separately from the main cell flow. The diffusion boundary layer at the work piece is controlled and minimized by the rate that fluid is withdrawn from the work piece chamber or through a port in the work piece.

One embodiment of the present invention is an apparatus that has a porous membrane adapted to conform to a surface of a solid work piece or substrate. The porous membrane is configured so as to separate the work piece from other process fluids or from a portion of the flow of a larger process fluid flow. The separation of the fluid flow by the apparatus forms a compartment and creates a gap between the porous membrane and the work piece or substrate. The apparatus may also have a port or conduit being in fluid communication with the compartment from outside the compartment. Fluid flow through the membrane is controlled by withdrawing fluid through the flow port or conduit, which causes a flow of fluid along the surface of the substrate or work piece. The fluid flow between the membrane and the substrate creates a thin layer of fluid in the gap between the membrane and substrate.

One embodiment of the present invention is an apparatus that includes a porous membrane proximate to and covering a substrate. The apparatus has a port that is also covered by the porous membrane. Fluid flow through the porous membrane cause a thin layer of fluid to flow between the substrate and the porous membrane and through the apparatus port. The flow of fluid flow between the substrate and membrane modifies the state of the fluid by transfer of mass and or energy with the substrate. The membrane may be flexible or bonded to a member which allows flexibility so that the membrane remains proximate to the substrate as the substrate changes shape. The substrate may be an electrode, a chemical reagent, a heat exchange element, a chiller, a catalyst, or a combination of these. The apparatus may further include a base for supporting the substrate. The base may have a port that is in fluid communication with the port in the substrate; the base port is also covered or enclosed by the porous membrane.

One embodiment of the invention includes a flexible convoluted member sealed to the porous membrane. The convoluted member forms a fluid tight seal with the base and maintains the porous membrane proximate to the substrate during fluid flow and changes in shape of the substrate. Another embodiment of the invention includes the use of a loose drainage material between the substrate and the porous membrane for maintaining the porous membrane proximate to the substrate surface and controlling the thickness of flow of fluid in contact with the substrate.

One embodiment of the present invention is a method for increasing mass or energy transport at liquid-solid diffusion boundary layer of a work piece that has at least one surface in contact with a liquid. The method includes providing a fluid flow at the surface of the work piece, and controlling the liquid-solid diffusion boundary layer at the work piece surface by segregating the surface liquid flow from other liquid flows. The height of the segregated surface liquid flow between the membrane and the work piece surface is controlled by continuously removing liquid from the surface of the work piece in a manner that induces the surface liquid flow.

The method may also include modifying the state of a fluid in contact with a substrate. The method includes forming a thin film of fluid on the substrate by flowing a source of fluid through the porous membrane and between the substrate and membrane. The fluid flow between the membrane and substrate keeps or maintains the porous membrane proximate to the substrate. The state of the fluid flowing between the substrate and membrane is modified by transfer of mass or energy between the fluid and the substrate. The substrate may be an electrode, a chemical reagent, a heat exchange element, a catalyst, or a combination of these. After flowing across the substrate the fluid flows through a port in the apparatus which may be in the housing and or substrate, the port being separated from the bulk fluid source by the porous membrane; the port and substrate are enclosed or covered by the porous membrane.

DESCRIPTION OF DRAWINGS

In part, other aspects, features, benefits and advantages of the embodiments of the present invention will be apparent with regard to the following description, appended claims and accompanying drawings where:

FIG. 1A is a schematic diagram of an embodiment of the present invention illustrating a membrane covering or enclosing a port in the substrate and a port in the base;

FIG. 1B is a schematic diagram of the apparatus in FIG. 1A illustrating the relationship of the porous membrane to the substrate after the shape of the substrate has changed;

FIG. 2A is a schematic diagram of an embodiment of the present invention illustrating a porous membrane enclosing a port in the substrate and a port in the base and a loose drainage layer between the substrate and the porous membrane;

FIG. 2B is a schematic diagram of the substrate in FIG. 2A illustrating the relationship of the porous membrane and the loose drainage layer to the substrate after the shape of the substrate has changed;

FIG. 5B is a schematic diagram of a substrate having multiple ports for fluid flow.

DESCRIPTION OF THE INVENTION

Figure 3:
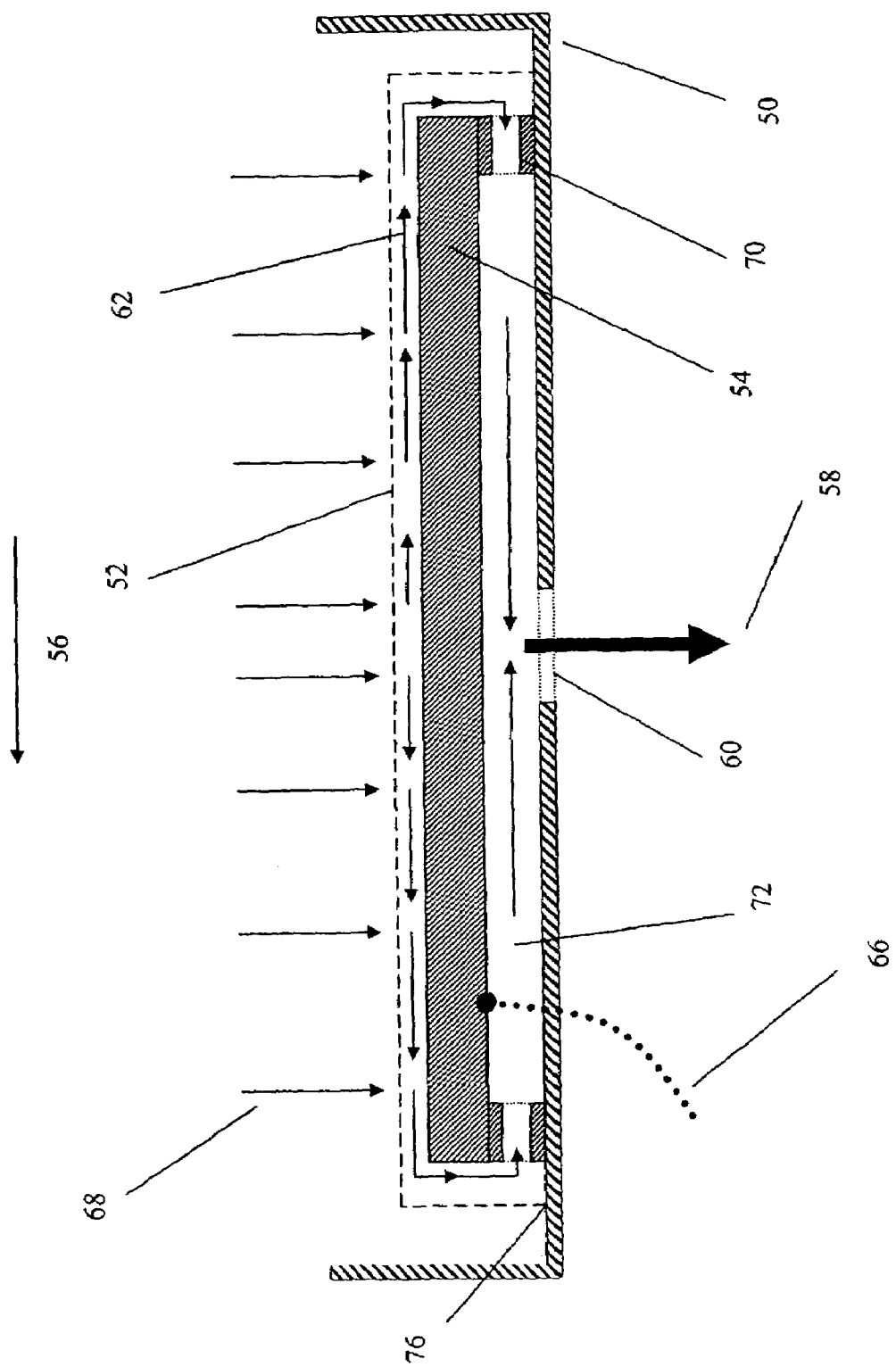
FIG. 3 is a schematic diagram of the substrate illustrating a porous membrane covering or enclosing a substrate and ports.

Before the present compositions and methods are described, it is to be understood that this invention is not limited to the particular molecules, compositions, methodologies or protocols described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference. Nothing herein is to be construed as an admission that the invention is not entitled to antedate such disclosure by virtue of prior invention.

FIG. 1A is a schematic diagram of an apparatus in an embodiment of the present invention. The cross sectional representation shows a substrate or work piece 14a with standoffs 30 and conforming porous membrane 12 (depicted by dashed or broken lines) proximate to and covering the substrate or work piece 14a thereby creating a compartment defined by the boundary layer fluid flow 22. The porous membrane covers or encloses the substrate and one or more substrate port(s) 38 and base port(s) 20 and directs or causes membrane fluid flow 28 to flow as a thin boundary layer film of fluid 22 between the substrate 14a and the porous membrane 12.

Boundary layer fluid 22 flows between the porous membrane 12 which and the substrate 14a within a fluid cell or base 10. The source of fluid 16 above the membrane 12, may be flowing or static, and may be the fluid in a conduit, fluid in a re-circulating fluid flow system, or fluid from a bulk fluid source. The membrane fluid flow 28 through the conforming porous membrane 12 and is governed by the rate at which fluid is withdrawn 18 from the base port 20 and the substrate port 38. The membrane may be secured 36 between the stand offs 30 and the substrate 14a using a gasket, a fusion bond, or an adhesive. After the membrane fluid flow 28 passes through the membrane 12, it flows along the surface of the work piece 14a creating a thin film of fluid or a boundary layer flow 22 which is maintained at a average thickness or height 32 which substantially maintains the porous membrane 12 proximate to the substrate 14a. The state of the fluid 22 is changed relative to its state as a source of fluid 16 or before flowing through the membrane 28; mass and or energy may be transferred between the fluid 22 and the substrate 14a. The membrane may be secured to the substrate between the standoff 30 and the substrate 14a.

The solid substrate 14a, which may be an electrode, a chemical reagent, a heat exchanger, a catalyst, or a combination of these has an initial thickness 34a or shape prior to fluid flow 22 along the surface of the substrate. FIG. 1B is a schematic diagram of the substrate 14b after a change in its shape or thickness 34b due to mass transfer between the thin film of fluid 22 and the substrate 14a. The boundary layer flow 22 substantially maintains a relatively uniform thickness or height 32 between the porous membrane 12 and the substrate 14b. The membrane may be flexible so that the porous membrane remains proximate to the surface of the substrate as the substrate changes shape. The change in the shape of the substrate has been idealized in FIG. 1A and FIG. 1B. Consistent with embodiments of the invention the shape of the substrate may be unchanged, as for a substrate that is a heat exchanger. The substrate 14a may be or become concave, convex, and the surface of the substrate may be or become pitted or rutted, however the porous membrane 12 is sufficiently flexible to conform to the surface of the substrate as the substrate changes shape. The porous membrane remains proximate to the substrate 14a at an average separation height 32 during fluid flow 22. The substrate 14a is shown loosing mass, however the substrate may also gain mass and increase in height caused by removal of a contaminant from the fluid and depositing it on the substrate; the diagram is for illustrative purposes and is not intended to limit the scope of the invention.

FIG. 2A illustrates an embodiment of the invention where at least one connection 26 is made with the substrate 14a. The connection is preferably an electrical one made to a suitable power supply for cases of heat exchange or electrochemical processes, but the connection 26 may also provide a heat sink for the substrate 14a. Where the substrate is comprised of pieces or ingots, a platinum mesh or other inert and electrically or thermally conductive mesh (not shown) may be placed below the solid pieces as would be known to those skilled in the art to provide electrical or thermal connection with the substrate pieces. FIG. 2A also illustrates a porous drainage layer 24 positioned between the porous membrane 12 and substrate 14a. The drainage layer provides support for the membrane 12 and also provides additional passage for boundary layer fluid 22 along the substrate. Preferably, the drainage layer 24 is made from TYVEK®, available from DuPont de Nemours of Delaware, or other fibrous polyethylene, polypropylene or other chemically compatible material. Preferably the loose drainage layer, such as the TYVEK®, is hydrophilized to make it hydrophilic. FIG. 2A illustrates schematically that the membrane 12 is maintained at an average separation 32 from the substrate 14a by the loose drainage layer material 24 and thin film of fluid 22. FIG. 2A illustrates the fluid flow layer 22 thickness 32 between the substrate 14a and membrane 12 with loose drainage layer 24 interposed. The substrate 14a has an initial thickness 34a.

FIG. 2B illustrates the loose drainage layer 24 and membrane 12 conforming to the substrate 14b and maintaining fluid flow layer 22 at an average separation 32 after the substrate has been reduced in thickness by mass transfer to thickness 34b.

FIG. 3 is a schematic cross sectional representation of a work piece 54 and conforming membrane 52 creating a compartment or gap illustrated by boundary layer fluid flow 62 between the membrane 52 and the substrate 54 within a fluid cell or housing 50. The membrane is attached to a rigid ring, plate or cup (including the fluid cell 50) with sufficient membrane to allow the membrane to conform to the surface of the solid piece 54 as it changes shape. The membrane may be bonded to the cell 50 at 76 by methods including but not limited to fusion bonding, ultrasonic bonding, or adhesives. The fluid cell or base 50 may be part of a re-circulating fluid system or it may be part of a single flow through device. Fluid source 56 may be flowing or static. In FIG. 3 the membrane fluid flow 68 into and through the membrane 52 creates a thin film or boundary layer flow 62 that is maintained around the outside of the work piece or substrate 54. The boundary layer flow is directed through a porous or multi-orifice ring 70 on which the substrate 54 is mounted, through channel 72 and is withdrawn through the fluid conduit 60 as depicted by the schematic flow line 58. A connection 66 is shown attached to the work piece 54.

Figure 4:
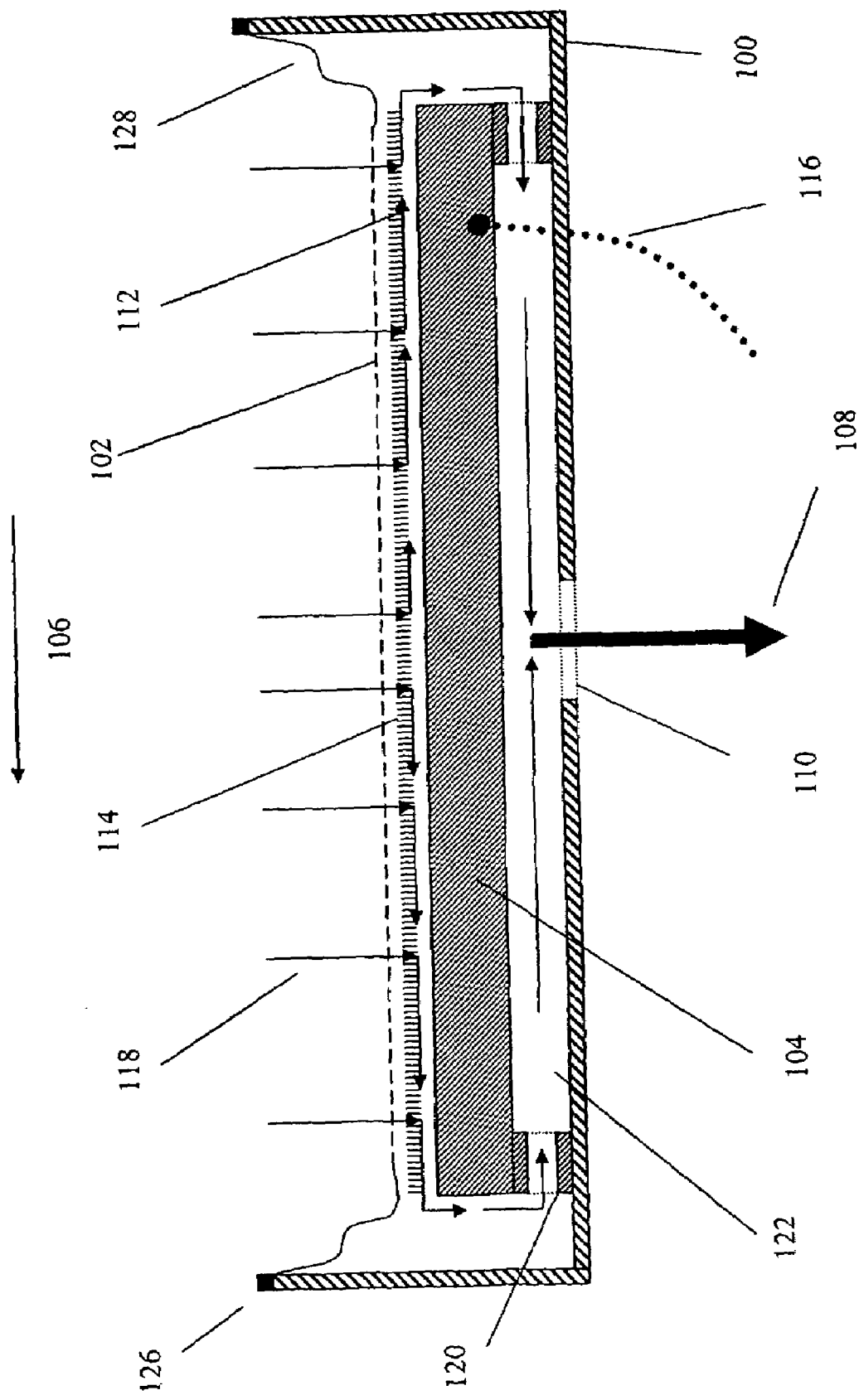
FIG. 4 is a schematic diagram of a substrate illustrating a porous membrane enclosing a substrate and connected to a flexible convoluted member sealed to the porous membrane and apparatus base.

FIG. 4 is a schematic, cross sectional representation of a work piece 104 and porous membrane 102 bonded with a flexible, convoluted member 128. The flexible convoluted member 128 is connected to an attachment ring 126 connected to housing or work piece holder 100. The porous membrane 102 is attached to the convoluted member 128 creating a compartment or gap between the substrate 102 and the porous membrane 102 formed by boundary layer fluid flow 112 between housing 100. The membrane 102, flexible convoluted member 128 and attachment ring 126 are preferably of similar polymeric material and fused together but could alternately be mechanically clamped to create an integral seal. The attachment ring 126 can be fused to the housing 100 or mechanically attached to allow for opening of the compartment to replace the work piece 104. A portion of the membrane fluid 118 flow from source flow 106 flows into the membrane and across the surface of the substrate 104 creating a boundary layer flow 112 with a porous drainage layer 114. The energy or chemical state of the fluid 112 is modified by the substrate 104 and exits the housing 100 by passing through a porous, single opening, or multi-orifice ring 120 located below or to the side on which the work piece 104 is mounted. The fluid may flow along channel 122 and is withdrawn as fluid 108 through the fluid port 110 in the base of the housing 100. An optional connection 116 is shown attached to the work piece 104 for heat sinking of the substrate or for electrical connection; the connection forms a fluid tight seal (not shown) with the base of the housing 100.

Figure 5A:
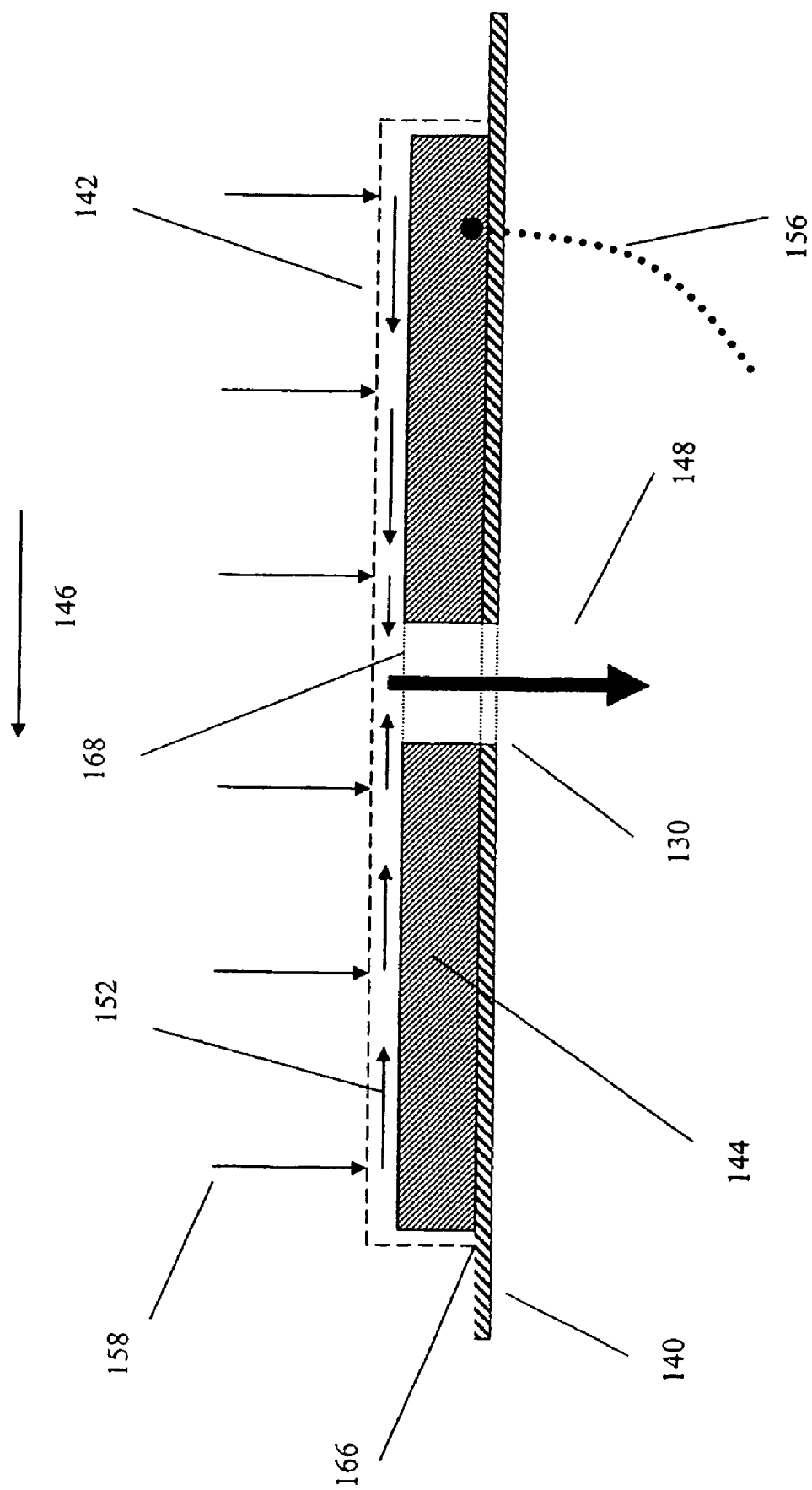
FIG. 5A is a schematic diagram of a substrate and a base having a port for fluid flow enclosed by a porous membrane.
Figure 5C:
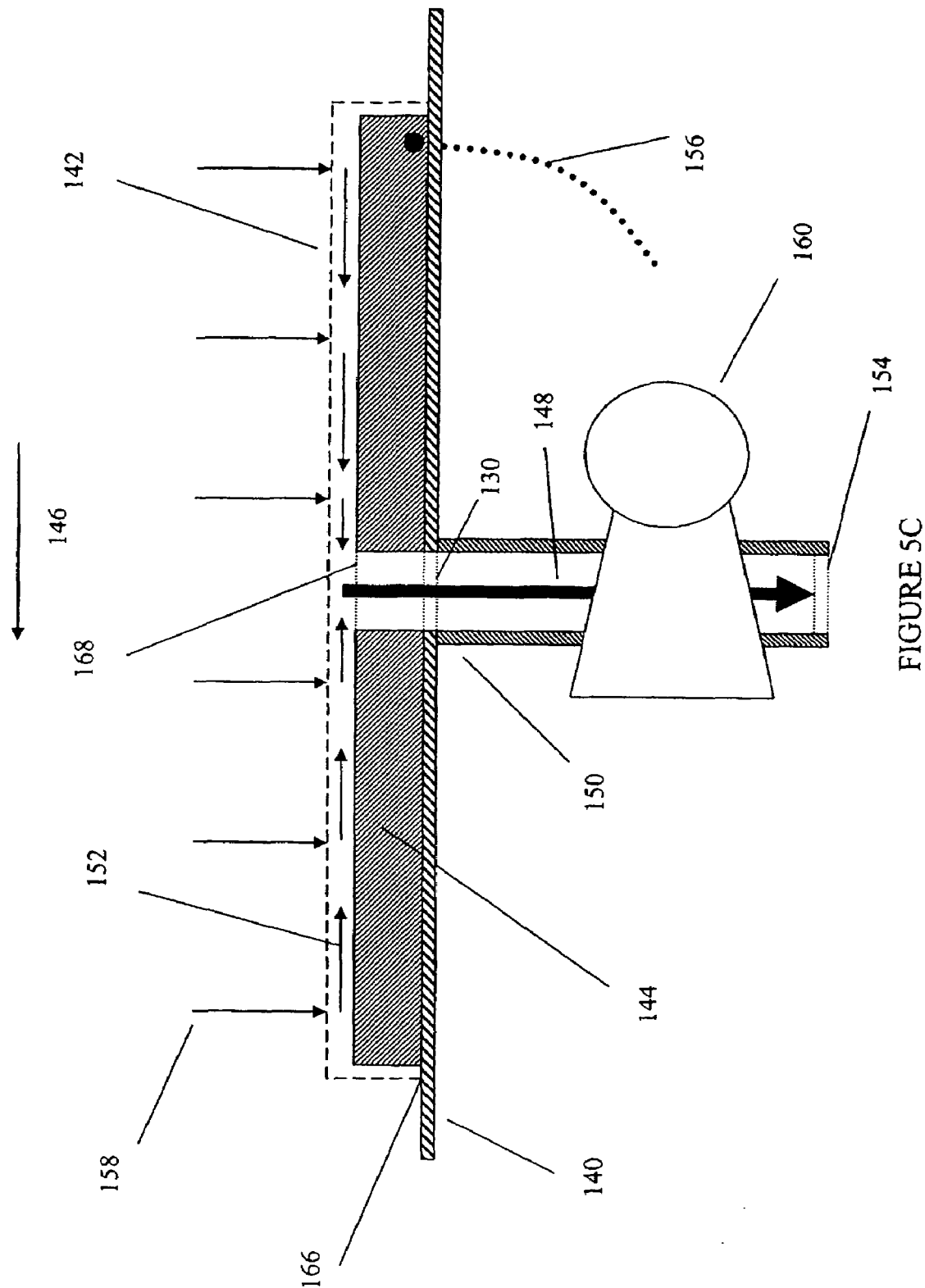
FIG. 5C is a schematic diagram of a substrate and base with a port where the port is connected to a conduit and a fluid flow control device.

FIG. 5 is a schematic, cross sectional representation of a work piece 144 and conforming porous membrane 142 attached to a flexible or rigid film or base 140 that forms a compartment that can be separated from the main fluid source 146. The conforming membrane 142 can be either thermoplastically sealed or mechanically clamped at 166 to the flexible or rigid film or membrane 140. Fluid from the main fluid source 146 a portion of which is a membrane flow of fluid 158 that flows through the membrane 142 at a rate equal to that withdrawn from the port 130 in the base and port 168 in the substrate 144 as depicted by the schematic fluid flow line 148. The boundary layer flow of fluid 152 between the substrate 144 and membrane 142 results in modification of the state of the fluid 152 by exchange of mass or energy as the fluid passes over the substrate 144. A connection to the substrate 156 is shown. FIG. 5B illustrates an apparatus of where the fluid flow 152 between the membrane 142 and substrate 144 is through multiple opening conduit or ports, as for example base ports 130a, 130b, 130c that extends through the base and multiple openings or ports 168a, 168b, 168c that extend through the substrate or work piece 144. The ports may be connected to an external flow circuit through conduits (not shown) attached to the ports. FIG. 5C illustrates conduit 150 with opening 154 connected to port 130 of base 140 and device 160 for regulating flow of fluid 148 and fluid flow 152 across the substrate 144. The apparatus may be connected to an external flow circuit (not shown).

Figure 6:
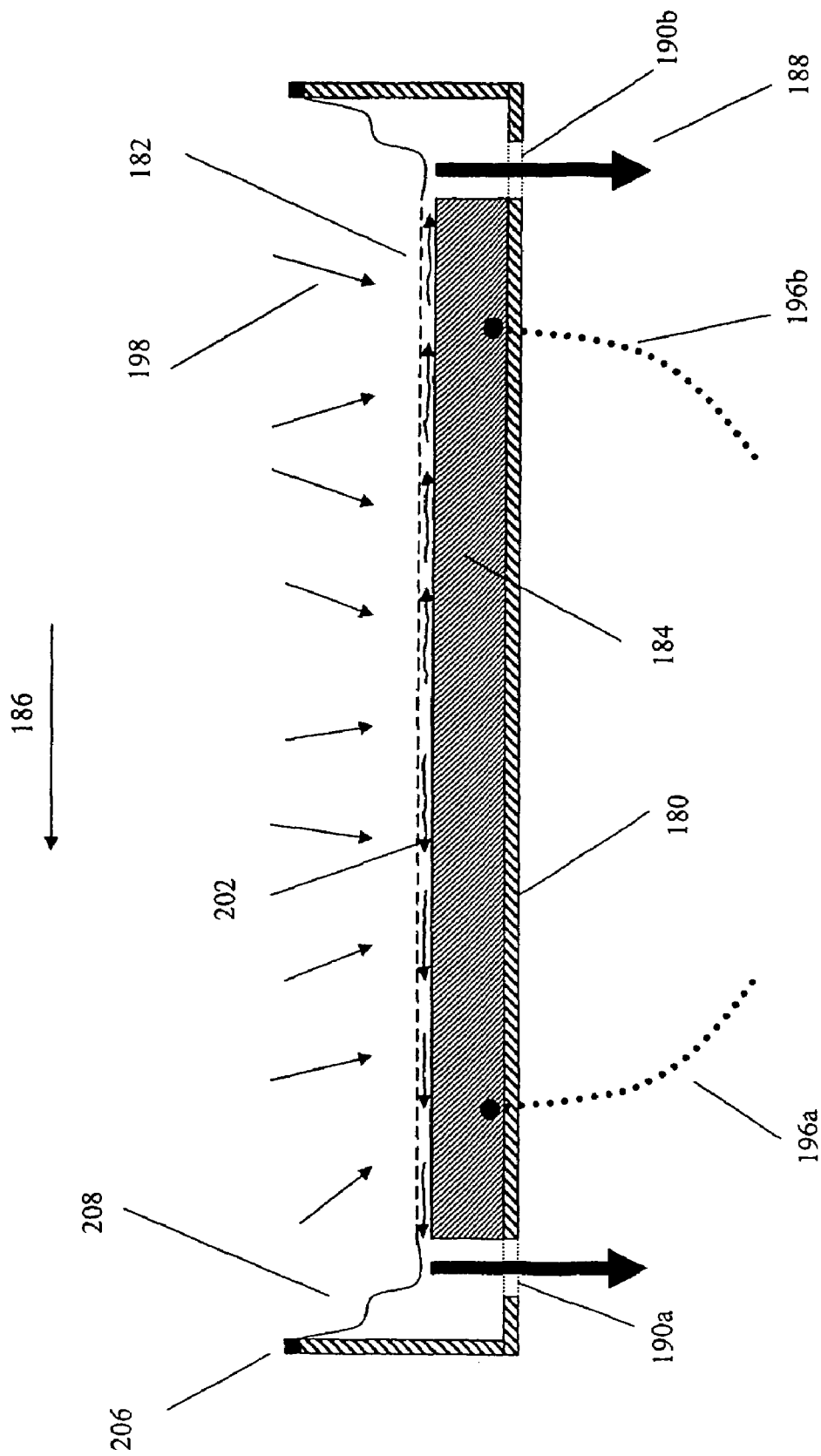
FIG. 6 is a schematic diagram of a substrate having multiple connections, a base having ports, and a porous membrane connected to a flexible convoluted member that encloses or covers the ports in the base.

FIG. 6 is a schematic illustration of an embodiment of the present invention. A portion of membrane fluid flow 198 from source fluid 186 flows through the porous membrane 182. The fluid creates a boundary layer flow 202 along the surface of the substrate 184. The porous membrane 182 encloses both the substrate 184 and ports 190*a* and 190*b* in the apparatus base 180. The ports 190*a* and 190*b* in the apparatus base 180 and permit the fluid 202 in contact with the substrate to exit the base 180. The fluid 188 which exits the apparatus may be use for further processes including but not limited to contaminant removal, film deposition, or temperature conditioning (not shown). The diagram illustrates two connections, 196*a* and 196*b*, which may be for electrical connections to a power supply or for heat sinking the substrate. The electrical connections may be used to heat or cool the substrate 184 and fluid 202. The boundary layer flow 202 maintains the porous membrane 182 proximate to the substrate 184 at an average separation height and results in a modification of the state of the fluid 202.

The apparatus illustrated in FIG. 6 includes a flexible convoluted member 208 sealed to the porous membrane 182. The convoluted member 208 forms a fluid tight seal 206 with the base 180 and maintains the porous membrane 182 at an average separation from the substrate 184 such that it is proximate or conforming to the substrate 184 during fluid flow 202 and changes in the shape of the substrate 184. The flexible member 208 may be a separate porous or non-porous thin film with a corrugated or convoluted shape; the flexible member 208 may be attached to a fixed ring or housing at 206 as shown.

In one embodiment of the present invention the membrane is bonded directly to a fixed ring or to the housing at 206 (not shown). Enough membrane is present so that the membrane conforms and is proximate to the substrate as the substrate changes shape or size. A loose drainage layer may also be bonded along with the membrane directly to the fixed ring or to the housing at 206 (not shown).

Figure 7:
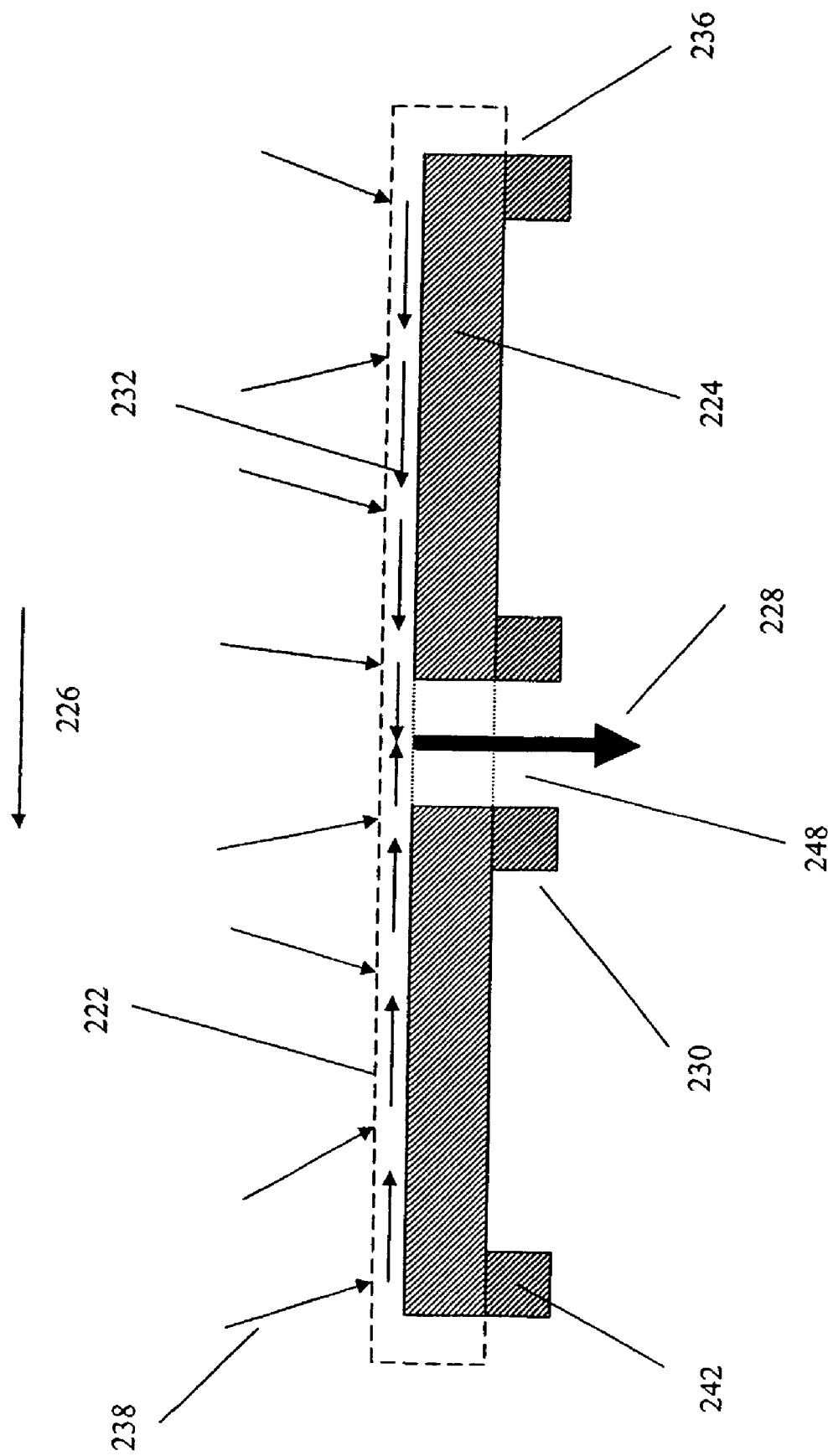
FIG. 7 is a schematic diagram of a porous membrane enclosing a substrate having a port.

FIG. 7 is a schematic illustration of an embodiment of the present invention. The apparatus includes a porous membrane 222 proximate to and enclosing a substrate 224 and a port 248 in the substrate 224 enclosed by the porous membrane. The porous membrane 222 may be secured by the substrate 224 at 236 by a retaining ring 242. The porous membrane 222 directs the membrane fluid flow 238 from a portion of the source of fluid 226 to flow as a thin boundary layer fluid film 232 between the substrate 224 and the porous membrane 222 and through the substrate port 248. The flow of fluid 232 between the substrate 224 and membrane 222 modifying the state of the fluid film 232 and substantially maintaining the porous membrane at an average separation proximate to the substrate 224. The modified fluid 228 may exit through substrate port 248 with optional members 230 for securing a conduit (not shown) for connection to a fluid flow circuit.

Figure 9:
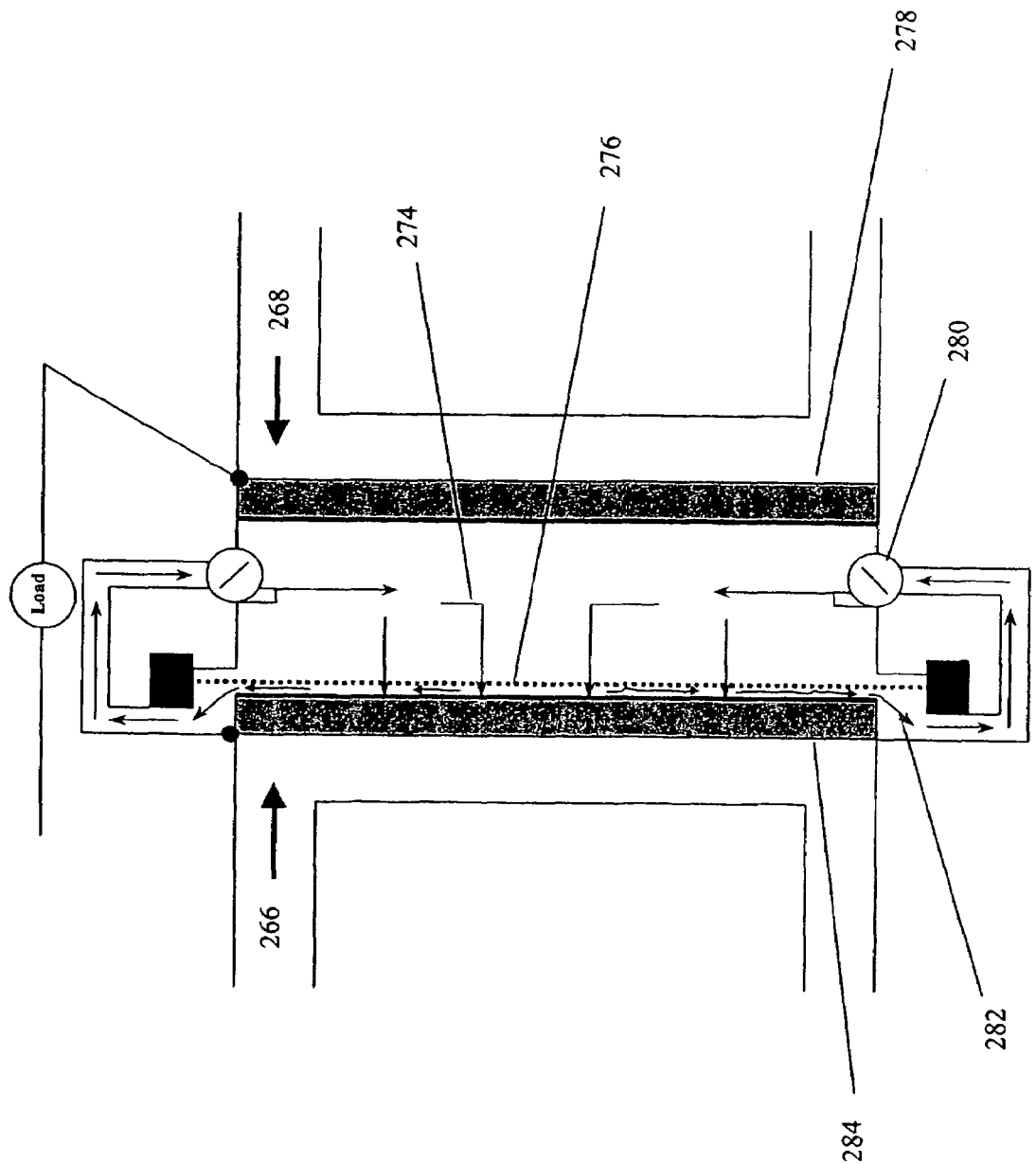
FIG. 9 is a schematic diagram of a fuel cell and with an electrode and membrane of the present invention.

FIG. 9 is a schematic diagram illustrating the use of the present invention in a fuel cell. The fuel cell includes two electrodes; for example cathode 278 and anode 284. A source of fuel 266, such as methanol or hydrogen, and an oxidant 268. The porous membrane 276 conforms to the surface of the anode 284 and boundary flow of fluid 282 between the porous membrane 276 and anode 284 may be maintained by pump 280 and provides a fluid source flow 274.

The present invention is an apparatus for increasing the mass or energy transport at the fluid-solid diffusion boundary layer between a solid work piece and a fluid. The apparatus includes a porous membrane which is adapted to conform to a surface of the solid work piece or substrate. The membrane is configured about and covers or encloses the solid work piece and a port in the apparatus which may include the housing and or the work piece. Fluid, which may be a portion of a larger fluid flow, passes through the porous membrane and flows between the porous membrane and the work piece. Lateral fluid flow along the work piece surface occurs between the membrane and substrate and creates a gap or compartment filled with the fluid and defined by the volume between the membrane and the solid work piece surface. Mass and or energy exchange occurs between the solid substrate and the fluid in the gap modifying the chemical or energy state of that fluid. For example mass transfer may include but is not limited to transfer for ions to or from the substrate by use of the membrane to create the thin fluid layer between the substrate and membrane. Energy transfer may include but is not limited to transfer of thermal energy to or from the substrate by use of the membrane to create the thin fluid layer between the substrate and the membrane. Fluid flow though the membrane and between the substrate and membrane may be controlled via a port in the substrate or base or a conduit connected to such a port. The port or conduit is in fluid communication with the compartment from outside the compartment.

The thickness or height of the thin film of fluid that flows between the porous membrane and substrate may vary in height across the substrate and membrane due to the local fluid velocity, rate of fluid withdrawal through the apparatus port, membrane pore size, and substrate contour. The porous membrane may physically touch the substrate, preferably the porous membrane is separated from the substrate by the film of fluid or boundary layer flow of fluid. The thickness, separation, or height of the thin fluid film between the porous membrane and substrate will have an average value, preferably the thin film separation varies by less than about 50% of the average separation between the membrane and substrate. Thin fluid films may be but are not limited to an average height of less than about 2000 microns, and preferably less than about 750 microns. By the membrane being maintained substantially proximate to the solid work piece or substrate it is meant that the porous membrane and or the loose drainage layer are separated from the surface of the solid substrate or work piece by the height of the thin film including but not limited to any of the variation described above.

The porous membrane of the device may be a polymeric material, such as but not limited to polyethylene, polypropylene, polytetrafluoroethylene (PTFE), poly(tetrafluoroethylene-co-perfluoro(alkylvinylether)) (PFA), or polyvinylidene fluoride (PVDF). The current invention is a device that creates a uniform, thin diffusion boundary layer at the interface of solid surface and a porous membrane conforming to and enveloping the solid surface, forming an isolated flow compartment. It is also advantageous if the porous membrane is hydrophilic (made by surface modification of the membrane) or made from a hydrophilic polymer (such as polysulfone, polyarylsulfone or polyethersulfone). Materials with such properties can ensure uniform liquid flow through the membrane in the event of gas entrapment in the compartment between the porous membrane and substrate.

The pore sizes for the porous membrane may range from 0.005 micron to about 50 micron, and preferably from about 0.5 to about 20 microns. The pore size of the porous membrane may be used to control liquid flow through the membrane and to effect the thickness of the thin film of fluid between the porous membrane and substrate. The membrane may also act as a filter media. The thickness of the membrane may be in the range of about 1 to 500 microns, and preferably from about 5 to about 50 microns. The membrane should be chemically and thermally compatible with the fluid and solid substrate and should have a thickness that will provide strength to the membrane as it conforms to the substrate. The pressure drop of fluid through the membrane may be modified by the size of the porous membrane pores as well as the number and distribution of pores in the membrane. The membrane may be hydrophilic or hydrophobic; the surface energy of the membrane may be modified through application of a coating to the membrane or by chemical modification of the membrane surface.

The porous membrane is preferably sufficiently flexible to conform to and remain substantially proximate to the surface of the solid piece as it changes shape. The membrane should remain integral and maintain a constant flow rate through the membrane during use. The membrane may be fixed to a ring or housing to allow the membrane to conform to the solid work piece surface. The membrane may be secured to the substrate by a retaining ring as show in FIG. 7. The membrane may be attached to a rigid ring, plate or cup with enough excess membrane material to allow the membrane to conform to the surface of the solid piece as it changes shape. The membrane may be attached between the substrate and the ring. The membrane may be attached to a flexible convoluted member that allows the flexible member and membrane to conform to the surface of the substrate as it changes shape. The convoluted member is similar in construction and function to the surround portion of an audio loudspeaker that connects the speaker cone to the basket. The convoluted member may be formed from a thin flexible plastic material by molding or thermoforming. The convoluted member can be made of a thin, solid plastic material, a thin porous foam, woven plastic or non-woven plastic material. A thin, solid, plastic film of polyethylene is the preferred embodiment so that a fusion weld can be achieved. It is preferred that the convoluted member be made of the same or similar material as the membrane so that they can be fused together.

The flexible member may be a separate porous or non-porous thin film with a corrugated or convoluted shape and the flexible member is attached to a fixed ring or housing and the membrane. The membrane may be use as the convoluted member and attached directly to the fixed ring or housing; excess membrane may be used to provide coverage of the substrate as it changes shape. The porous membrane attached to the convoluted member allows a compartment or gap between the substrate and the porous membrane to form with boundary layer fluid flow present between the solid substrate and porous membrane. The porous membrane, flexible convoluted member and optional attachment ring are preferably of similar polymeric material and fused together but could alternately be mechanically clamped to create an integral seal. The attachment ring can be fused to the work piece holder or mechanically attached to allow for opening of the compartment to replace the work piece.

The apparatus includes a porous membrane proximate to and enclosing or covering a solid substrate and an outlet port of the apparatus by the porous membrane. The membrane conforms to the surface of the solid substrate and remains proximate to it as fluid flows between the solid and the porous membrane creating a compartment or gap between them. Fluid flows through the porous membrane, between the membrane and the solid substrate, and then through a port in the apparatus which may be in the substrate, the housing, or both. Preferably the membrane is porous to a liquid so that liquid is able to flow through the membrane. Fluid through the apparatus port exits the apparatus and the fluid may be connected to a fluid flow circuit. The state of the thin layer of fluid flowing between the substrate and membrane is modified by contact with the substrate. In the practice of this invention the membrane remains substantially proximate to the substrate during fluid flow and changes in substrate shape. The boundary layer is a function of the fluid velocity at the substrate surface. This is governed by the fluid flow through the porous membrane and distance between the membrane and the substrate (which may also be maintained by the loose drainage layer). The effect of a particular boundary layer thickness on a given process is dependent on the process materials (liquid and solid substrate) and their concentration in terms of mass transfer rate. The construction of materials affects the boundary layer. The use of a hydrophilic membrane, a more open membrane, a thin support layer with good lateral flow capabilities could enhance fluid flow rate, thus reducing the boundary layer.

The device may further comprise a loose drainage layer between the solid surface and the membrane. The drainage layer is preferably thinner than the boundary layer at the surface of the substrate with a flow of liquid without a porous membrane present. The drainage layer may be made from a material that is woven, a netting material, a cast material, a wool, or other fibrous mesh material. Useful loose drainage materials include but are not limited to chemically compatible polymers such as polyethylene, polypropylene, polytetrafluoroethylene, quartz, or glass material. Preferably the loose drainage layer is TYVEK®, available from DuPont de Nemours of Delaware, and preferably, the TYVEK® is hydrophilized.

Preferably the hydrophilic porous membranes and or loose drainage layers used in various embodiments of the present invention utilize a preformed ultra-high molecular weight polyethylene (UMWPE) porous membrane disclosed in U.S. Pat. Nos. 4,778,601 and 4,828,772, the contents of which are incorporated herein by reference in their entirety. These membranes or loose drainage layers may have their surface modified to make them hydrophilic. The membranes or drainage layer may be made hydrophilic with a cross-linked hydrophilic polymer described in U.S. Pat. No. 4,618,533 the contents of which are incorporated herein by reference in its entirety. The hydrophilized membrane may be attached to a ring or housing and a similarly hydrophilic spunbond high density polyethylene loose drainage layer. Polytetrafluoroethylene membranes and other perfluorinated polymer may used and may also be made hydrophilic by the methods and compositions disclosed in U.S. Pat. Nos. 5,629,084 and 5,928,729 the contents of which are incorporated herein by reference in their entirety.

Fresh solution, from a bulk fluid source or flow, is introduced through the porous membrane by withdrawing the fluid from the between the membrane and substrate via an apparatus port or by withdrawing fluid from the work piece compartment. Optionally, a drainage layer comprised of porous material (such as non-woven, melt blown or spunbond HDPE, polypropylene, ECTFE,) between the membrane and the solid surface may be used to provide consistent flow channels along the solid surface. As the fluid is forced to flow between the membrane and the solid surface, it creates a thin diffusion boundary layer conforming to the substrate surface. High chemical or electrochemical reaction rates can thus be achieved. The fluid source may be static or flowing and may include gases, liquids, or supercritical fluids.

In the present invention the solid substrate or solid work piece may be an electrode, a chemical reagent, a heat exchange element, a catalyst, or a combination of these. The apparatus may further include a base for supporting the substrate. The substrate or work piece may be a solid monolithic material as in the case of a heat exchanger or an electrode. The substrate may also be made up of smaller pieces like ingots which are secured, fit, or positioned together to form a substrate that may be supported by a base. The substrate may be made of powders which are pressed or sintered together to form a fritted substrate or work piece. The porous membrane conforms to or is proximate to the surface of the solid and permits a flow of fluid between the membrane and the solid. The composition of the substrate may include but is not limited to copper, nickel, various stainless steels, carbon, noble metals like platinum, coated materials such as silicon carbide, and ceramics like alumina.

One or more electrical connections, or one or more connections for heat sinking the substrate may be made. Electrical connections, through for example a chemically inert material such as titanium, may be made with the substrate to a DC power supply or to a alternating current power supply. The connections are sealed through the housing to prevent fluid flow through the connection. Where the substrate is comprised of electrically conductive pieces or ingots, a platinum mesh or other conductive mesh may be placed in contact with the solid pieces to provide electrical contact to the pieces as would be known to those skilled in the art to provide electrical or thermal connection with the pieces.

The fluid which passes through the porous membrane and contacts the substrate may be a gas, a liquid, or a supercritical fluid. The fluid may include suspended materials provided the membrane is sufficiently porous to prevent clogging or plugging of the membrane by the suspended material. Aqueous solutions including but not limited to those with acids, bases, or dissolved salts; organic liquids such as ethylene glycol, acetic acid, photoresists may also be used with the apparatus and methods of the present invention.

In the apparatus, the membrane separates a bulk source of fluid from the substrate and a port. The port may be located in the substrate, the base, or in both; the port is covered by the membrane as shown in FIGS. 1-7. The port allows fluid that has exchanged mass or energy with the substrate to leave the apparatus. The port may be connected to a fluid flow control or metering device, the fluid flow circuit of a process tool, a conduit, or to another fluid vessel. The substrate may have a single port as shown in FIG. 1A, it may have multiple ports as shown in FIG. 5B, or the substrate may be a sintered material comprised or a plurality of pores (not shown). In the case of a porous substrate, flow through the substrate may be controlled by the size of ports in the base as shown for example in FIG. 3. In the apparatus, the base may have one or more ports for fluid flow as shown in FIG. 6; in this case the substrate may be a solid. Where the base and substrate or work piece have ports or conduits, they are in fluid communication with each other so that fluid may be removed from between the porous membrane and substrate thereby maintaining the porous membrane proximate to the substrate and modifying the state of the fluid. The ports and or conduits between the base and substrate may be aligned.

For a solid whose surface, size, or shape changes over time, such as by erosion of a work piece in an electrochemical processes or an electrode which plates out a contaminant from the fluid, a loose, flexible or moving porous membrane may be used to allow the porous membrane to conform to the solid surface as it changes its shape due to plating, dissolution or erosion.

More specifically, the current invention uses a porous membrane to separate the bulk of the fluid from the solid work piece, creating an essentially separated flow compartment, with flow ports(s) for fluid communication with a fluid flow circuit. Conduits may be connected to the ports to provide physical connection to the fluid flow circuit. The conduits may be welded, threaded, or include flared connections to the apparatus ports. The ports may be connected directly to a valve or other flow control device such as but not limited to a pump, a fluid flow meter, or an orifice. Controlling the flow of fluid through the flow conduit regulates fluid flow across the membrane. Positive pressure upstream of the membrane or a negative pressure downstream of the flow conduit creates fluid flow across the membrane. A separate, loose drainage layer, such as very porous non-woven membrane may be used between the porous membrane and the solid surface to control the distance between the membrane and substrate, and prevent plugging of flow due to physical contact of the membrane and substrate. Increasing the flow of fluid through the membrane increases fluid velocity and decreases boundary layer film thickness.

In the present invention the state of the fluid is modified by a transport of mass or energy between the substrate and the flowing fluid. The substrate may be an electrode, a chemical reagent, a heat exchanger, a catalyst or a combination of these. Applications of the invention include the solid electrode of electrochemical cells where the electrochemical reactions take place at liquid and solid interface, such as, but not limited to electroplating cells, electrolytic cells, batteries with recirculating fluids, fuel cells. It is also applicable to electropolishing, electrochemical machining or chemical polishing processes. The substrate may be heat exchange device such as a resistive heater or a Peltier cooler, alternatively the substrate could be an electrode such as anode or a cathode. The state of a fluid in contact with a substrate may be modified by flowing a source of fluid through a port where the substrate and port are enclosed by a porous membrane. Flowing fluid through the membrane forms a thin fluid film between the membrane and the substrate which modifies the state of the fluid by transfer of mass or energy between the fluid and the substrate. The porous membrane remains proximate to the substrate even if the shape and or the size of the substrate changes.

The housing or base of the apparatus may have one or more ports for the flow of fluid modified by the substrate. There may be single or multiple ports that extends through the work piece. There may also be a single or multiple opening conduit that is located below or to the side of the work piece. The base port or substrate port may be optionally connected to conduits as part of a fluid flow system. Fittings may include welded, threaded, compression, or flared fittings. The device may further include a base for supporting the substrate. The base may have a base port in fluid communication with the substrate port; the base port is enclosed by the porous membrane. The housing may be or a part of it may be collapsible. For example the side wall of the housing shown in FIG. 4 may be flexible and move to allow the membrane to remain proximate to the substrate.

Increasing mass transport at liquid-solid diffusion boundary layer of a work piece having at least one surface in contact with liquid may be achieved by providing a liquid flow at the surface of the work piece and controlling the liquid-solid diffusion boundary layer at the work piece surface by segregating the work piece surface liquid flow from other liquid flows using a membrane. The height of the segregated surface liquid flow along the work piece surface may be controlled by continuously removing liquid from the surface of the work piece in a manner that induces the liquid flow.

EXAMPLE 1

Figure 8A:
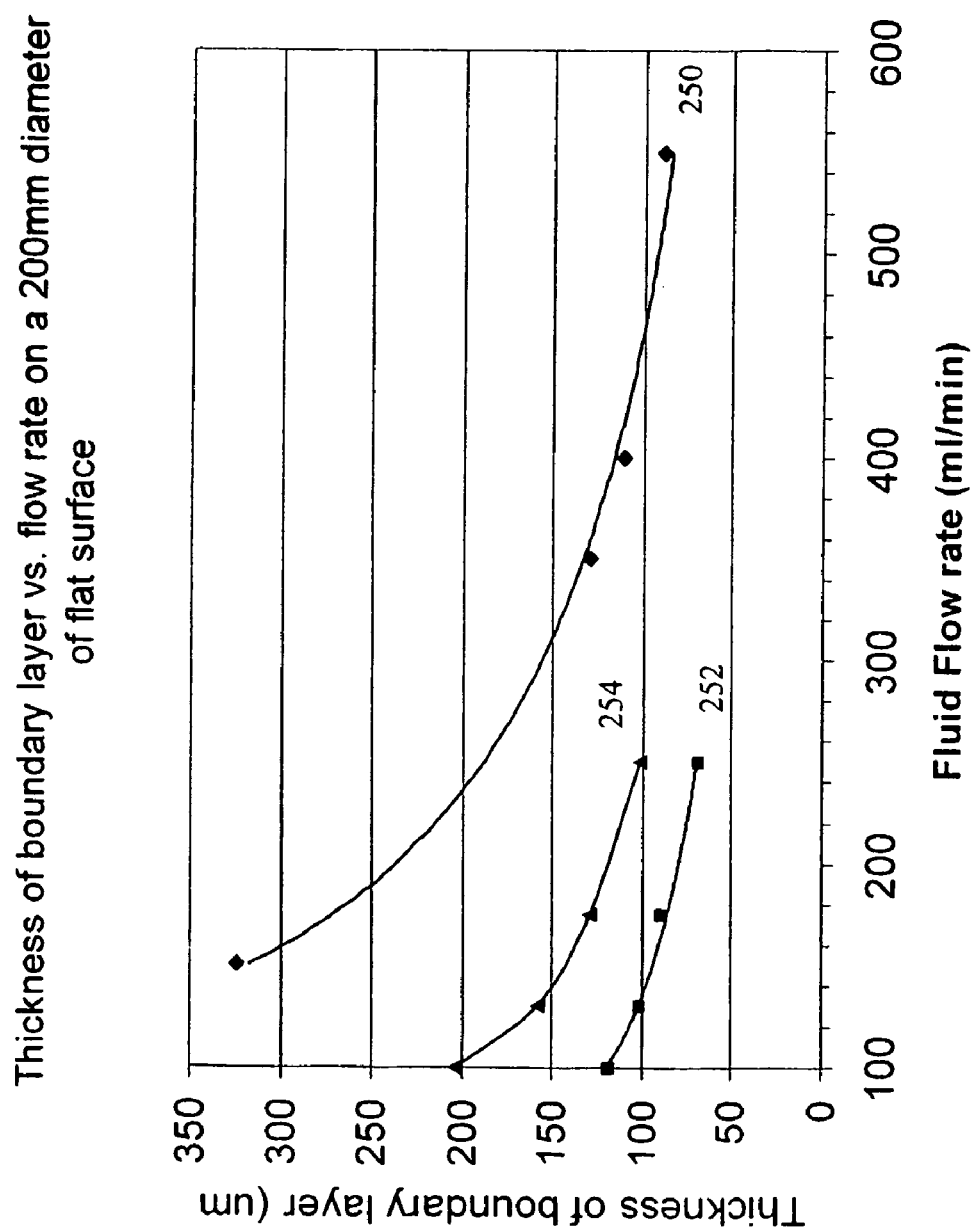
FIG. 8A is a graph of the fluid layer thickness between the substrate and porous membrane with the present invention.

Control of the boundary layer thickness at a substrate using the present invention is illustrated in FIG. 8A. The thickness of the boundary layer at a substrate, such as the one enclose by a membrane of the present invention may be determined by electrochemical methods. In this example the porous membrane covering the substrate is 0.2 m UPE membrane with a thickness of about 20-40 m. For example it is known that the limiting current in an electrochemical cell is a function of the thickness of the fluid boundary layer at given bulk concentration of ion in the fluid. The limiting current density may be determined through the relationship $i_L = [(nFD_i(\text{surface ion concentration} - \text{bulk ion concentration}))/(\text{thickness of boundary layer})]$; where n is the charge number for the ion of interest, for example for a cation $M^{+n}$ (i.e. for $Cu^{+2}$ or $Ni^{2+}$, n=2), F is the Faraday constant, $D_i$ is diffusion coefficient of the ion. The surface ion concentration for $M^{+n}$ may be taken as the concentration of the ion in a saturated solution.

The average thickness of the boundary layer of the fluid at the solid substrate without membrane 250, with the membrane 252, and with drainage layer and membrane 254, are each given as a function of flow rate of the liquid through the membrane as shown in FIG. 8A. The graph shows reduced boundary layer thickness for the substrate covered with the membrane 252 or membrane and drainage layer 254 compared to the boundary layer thickness for a solid substrate without a membrane 250.

Figure 8B:
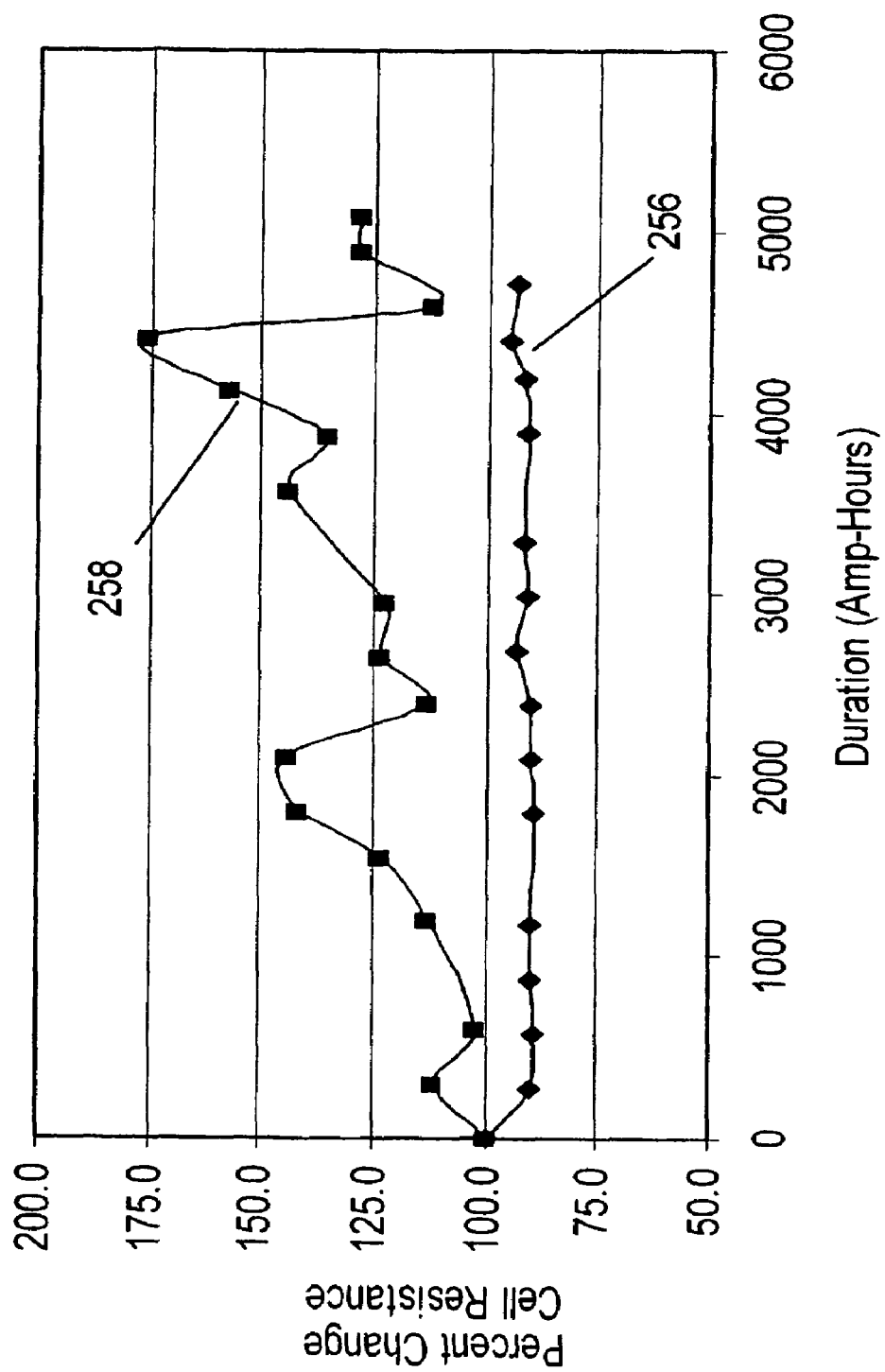
FIG. 8B is a graph illustrating the stability of the present invention over time with a porous membrane present.

The present invention provides for improved operation of the electrode as shown in FIG. 8B. In FIG. 8B the percent change in the resistance of a cell with an electrode over time with a flexible porous membrane present proximate to the electrode 256 and the resistance of a cell with an electrode over time without a flexible porous membrane present 258 over the electrode are shown. The resistance of the cell is a measure of the stability of the electrode in each system. The electrode with the porous membrane proximate to the electrode has much less variation in cell resistance over time compared to the cell without the membrane. The graph shows that the porous membrane and apparatus of present invention controls the thin film of fluid and mass transfer between the substrate and the porous membrane.

EXAMPLE 2

Mass transfer is a limiting factor in fuel cell efficiency. In order to maximize mass transfer rates the anode-cathode gap is kept small and ion exchange materials are often used in the electrolyte area. The ion exchange membranes have limits in ion transport rates and temperature and are often deteriorated by oxygen.

A fuel cell with source of fuel 266, source of oxidant 268, and a conforming membrane 276 adjacent to the anode 284 surface could be used to control the fluid boundary layer 282 and maximize mass transfer as shown in FIG. 9. In order to implement the conforming membrane in a fuel cell, electrolyte re-circulation may be established using a pump 280. Re-circulation of the electrolyte would provide electrolyte flow 274 that passes through the membrane 276 and sweeps fluid 282 across the surface of the anode 284. As in other applications a thin under drain layer between the membrane and electrode could be used to improve flow rate and uniformity (not shown). Further, to implement such a solution it may be necessary to treat the electrode surface to make it very phobic to reduce the chances of "flooding" the anode media and thus reducing fuel (probably gaseous hydrogen) transfer into the electrolyte (could be liquid phosphoric acid or potassium hydroxide).

The present invention reduces the size and complexity of equipment required to improve the transfer of mass or energy at a solid-fluid interface. This greatly simplifies the complexity of the design of chemical reactor systems, decreases capital costs for such equipment, and enables the formation of uniform diffusion boundary layers at the substrate-fluid interface which is critical for certain coating applications, fuel cell operation, and electroplating processes.

Although the present invention has been described in considerable detail with reference to certain preferred embodiments thereof, other versions are possible. Therefore the spirit and scope of the appended claims should not be limited to the description and the preferred versions contain within this specification.

What is claimed is:

1. An apparatus comprising:
   a porous membrane proximate to and covering a substrate; and
   a substrate port covered by said porous membrane, the porous membrane directing a source of fluid to flow between the substrate and the porous membrane and through the substrate port, said flow of fluid flow between the substrate and membrane modifying the state of the fluid and substantially maintaining the porous membrane proximate to the substrate.

2. The apparatus of claim 1 further comprising a base for supporting said substrate, said base having a base port covered by the porous membrane, said base port in fluid communication with the fluid between the substrate and membrane.

3. The apparatus of claim 1 further comprising a loose drainage layer between the substrate and the porous membrane.

4. The apparatus of claim 1, wherein the porous membrane is hydrophilic.

5. The apparatus of claim 1, wherein the substrate is an electrode, a chemical reagent, a heater, a chiller, a catalyst, or a combination of these.

6. The apparatus of claim 1 wherein the flow of fluid between the porous membrane and the substrate is controlled by a flow meter, a pump, a valve, or an orifice in fluid communication with the fluid between the porous membrane and the substrate.

7. The apparatus of claim 1, further comprising at least one electrical connection between said substrate and a power supply.

8. The apparatus of claim 2 including a flexible convoluted member sealed to the porous membrane, said convoluted member forming a fluid tight seal with said base, said porous membrane and flexible convoluted member maintaining the porous membrane proximate to the substrate during fluid flow.

9. An apparatus for modifying the state of a fluid proximate a substrate; the apparatus comprising:
- a porous membrane proximate to and covering the substrate;
- the porous membrane directing a source of fluid to flow between the substrate and the porous membrane whereby the state of the fluid is modified; said flow of fluid substantially maintaining the porous membrane proximate to the substrate; and
- a base for supporting the substrate, said base having a base port in fluid communication with the flow of fluid flow between the substrate and the porous membrane, said base port covered by said porous membrane.

10. The apparatus of claim 9 including a flexible convoluted member sealed to the porous membrane, said convoluted member forming a fluid tight seal with said base, said porous membrane and flexible convoluted member maintaining the porous membrane proximate to the substrate during fluid flow.

11. The apparatus of claim 9, wherein said membrane is hydrophilic.

12. The apparatus of claim 9 further comprising a loose drainage layer between the substrate and the porous membrane.

13. The apparatus of claim 9, wherein the substrate is an electrode, a chemical reagent, a heater, a chiller, a catalyst, or a combination of these.

14. A method for modifying the state of a fluid in contact with a substrate, the method comprising:
- flowing a source of fluid through a port in an apparatus, said apparatus including a porous membrane and a solid substrate, said port and substrate covered by the porous membrane; the fluid flowing through the port also flowing between the substrate and membrane with the flow of fluid maintaining the porous membrane proximate to the substrate; and
- modifying the state of the fluid by transfer of mass or energy between the fluid and the substrate.

15. The method of claim 14, wherein the solid substrate is an electrode, a chemical reagent, a heat exchanger, a catalyst, or a combination of these.

16. An apparatus for increasing the mass transport at a liquid-solid diffusion boundary layer of a solid work piece exposed to a liquid environment, the apparatus comprising:
- a porous polymeric membrane attached to a housing and adapted to conform to a surface of the solid work piece and configured so as to separate the work piece from a portion of a process liquid source to form a compartment and create a gap between the membrane and the work piece; and
- a conduit being in fluid communication with the compartment from outside the compartment, whereby liquid flow though the membrane is controlled by withdrawing liquid from the flow conduit and a lateral flow along the work piece surface is created by the gap between the membrane and the solid work piece surface.

17. The apparatus of claim 16 further comprising a loose drainage layer between the solid work piece surface and the membrane.

18. The apparatus of claim 16, wherein the porous polymeric membrane is polyethylene, polypropylene, PTFE, PFA or PVDF.

19. The apparatus of claim 16, wherein the solid work piece is an electrode.

20. The apparatus of claim 16, wherein the porous polymeric membrane is sufficiently flexible to conform to the surface of the solid work piece as the solid work piece changes shape.

21. The apparatus of claim 16, wherein the porous polymeric membrane is fixed to a ring or housing to allow the membrane to conform to a surface of the solid work piece.

22. The apparatus of claim 21, wherein the porous polymeric membrane is attached to a rigid ring, plate or cup with sufficient membrane to allow the membrane to conform to the surface of the solid piece as the solid work piece changes shape.

23. The apparatus of claim 21, wherein the membrane is attached to a flexible member that allows the membrane to conform to the surface of the solid piece as solid work piece changes shape and
- the flexible member is a thin film with a convoluted shape and the flexible-member is attached to the housing.

24. The apparatus of claim 21, wherein the porous polymeric membrane is attached to a collapsible housing and the collapsible housing is a convoluted film.

25. The apparatus of claim 21, wherein where the flow conduit is a single or multiple opening conduit that extends through the work piece.

26. The apparatus of claim 18, wherein the porous polymeric membrane is hydrophilic.

27. The apparatus of claim 18, wherein the fluid is used to coat a substrate.

* * * * *